United States Patent [19]
Kubouchi et al.

[11] Patent Number: 5,586,776
[45] Date of Patent: Dec. 24, 1996

[54] LAMINATED METAL GASKET HAVING A VARYING BEAD STRUCTURE, THICKNESS, AND OVERLAP WIDTH

[75] Inventors: Kenji Kubouchi, Hirakatashi; Yuji Fukui; Kunitoshi Inoue, both of Higashi-Osakashi, all of Japan

[73] Assignee: Nippon Gasket Co., Ltd., Osaka, Japan

[21] Appl. No.: 509,457

[22] Filed: Jul. 31, 1995

[30] Foreign Application Priority Data

Aug. 19, 1994 [JP] Japan .................................. 6-195269

[51] Int. Cl.$^6$ ........................................................ F16J 15/08
[52] U.S. Cl. ................................................ 277/235 B
[58] Field of Search ............................. 277/235 B, 180, 277/236, 232

[56] References Cited

U.S. PATENT DOCUMENTS

| | | | |
|---|---|---|---|
| 5,269,541 | 12/1993 | Inamura | 277/235 B |
| 5,286,039 | 2/1994 | Kawaguchi et al. | 277/235 B |

FOREIGN PATENT DOCUMENTS

| | | | |
|---|---|---|---|
| 579353 | 1/1994 | European Pat. Off. | 277/235 B |
| 255253 | 11/1986 | Japan | 277/235 B |
| 83843 | 3/1989 | Japan | 277/235 B |
| 404219572 | 8/1992 | Japan | 277/235 B |
| 405039868 | 2/1993 | Japan | 277/235 B |
| 406174099 | 6/1994 | Japan | 277/235 B |

*Primary Examiner*—Scott Cummings
*Attorney, Agent, or Firm*—Armstrong, Westerman, Hattori, McLeland & Naughton

[57] ABSTRACT

A metal gasket for a cylinder head includes a superposed assembly of an elastic metal base plate having a plurality of beads formed along a plurality of juxtaposed holes for combustion chambers, an elastic metal adjusting plate having a plurality of beads formed along a plurality of juxtaposed holes for combustion chambers, and a grommet having a plurality of juxtaposed holes for combustion chambers which are smaller in diameter than the holes in the base and adjusting plates. The grommet is folded about the edges of the holes in the adjusting plate lying between the base plate and the grommet in intimate contact therewith, so that the holes in the base and adjusting plates and the grommet may be aligned to form a plurality of bores. The bead on the base plate is formed as a full bead between every two adjoining holes and as a half bead around the remaining edge of each hole, while the bead on the adjusting plate is a full bead along the entire edge of each hole, so that the bead on the base plate may extend over the bead on the adjusting plate between every two adjoining bores.

4 Claims, 3 Drawing Sheets

LAMINATED METAL GASKET HAVING A VARYING BEAD STRUCTURE, THICKNESS, AND OVERLAP WIDTH

BACKGROUND OF THE INVENTION

1. Field of the Invention

This invention relates to a metal gasket for sealing a joint between a cylinder head and a cylinder block in an internal combustion engine, particularly of the multicylinder type. More particularly, it relates to a gasket comprising two elastic metal plates laid on each other and each having a plurality of holes for combustion chambers and a bead formed along the edge of each hole, and a grommet attached to one of those plates.

2. Description of the Related Art

A reduction in weight, as well as an increase in output and an elevation in working temperature, are desireable characteristics of an internal combustion engine, and has been realized by employing aluminum, instead of cast iron, for making both a cylinder head and a cylinder block, or at least the cylinder head. Because aluminum has less rigidity, however, the cylinder head and block which are made of aluminum are likely to be lower in rigidity and easily displaceable from each other when the engine is placed in operation.

The joint between the cylinder head and the block of an internal combustion engine is sealed by a metal gasket having a bead forming an elastic seal between the deck surfaces of the cylinder head and block when fastening devices, such as bolts, are tightened for holding the cylinder head securely to the cylinder block with the gasket disposed therebetween. The tightening force applied to the bolts, however, tends to cause the cylinder head to bend, thereby creating an undesirably large clearance and distortion of material, particularly around the combustion chamber. The excess clearance and distortion cause combustion gases to leak and spoil, causing or damage to the gasket, while the substances deposited on the gasket from those gases weaken its sealing ability. The pressure of the combustion gases and the heat of the engine cause changes in the width of the clearance between the deck surfaces around the combustion chamber, and as a result, the failure of the bead on the gasket and a reduction in the tightening force of the bolts bring about a reduction in the sealing effect of the gasket.

Under these circumstances, there is known a metal gasket which comprises two elastic metal plates each having a bead formed along the edge of each bore, a grommet disposed between the elastic metal plates and close to a cylinder head and an intermediate plate disposed therebetween and close to a cylinder block, the grommet having an inner edge folded toward the cylinder block and over the inner edge of the intermediate plate, so that any clearance between the deck surfaces around the combustion chamber may be made up to prevent any reduction in function of the bead, while the elastic metal plates have a uniform spring force along the beads, so that the gasket may have improved sealing ability and durability, as disclosed in Japanese Patent Application KOKAI No. Sho 64-73157 (hereinafter referred to as "Prior Art 1"). There is also known a metal gasket which comprises two elastic metal plates each having a plurality of adjoining holes for combustion chambers and a bead formed along the edges of those holes, an intermediate plate disposed therebetween, and a grommet folded toward a cylinder head for holding one of the elastic metal plates which faces a cylinder block, and the intermediate plate having a bead formed along the bead on the elastic metal plate add projecting toward the cylinder head, as disclosed in Japanese Utility Model Application KOKAI No. Hei 4-34562 ("Prior Art 2").

Both of the prior art gaskets are, however, an assembly of four plates, and are, therefore, more expensive than any gasket formed by three plates, from the standpoint of material and manufacturing costs. Moreover, the former prior art gasket has a problem caused by the inner edge of the grommet folding toward the cylinder block for holding the inner edge of the intermediate plate. When the gasket is compressed to collapse between the cylinder head and block, the folded portion of the grommet acts as a shim for the bead on one of the elastic metal plates. As a result, the elastic metal plate facing the cylinder head has more stress than that of the plate facing the cylinder block, and the grommet has a large bending stress and a large amount of stress which tend to cause cracking and eventual failure of the grommet and the bead on the plate facing the cylinder head.

The gasket according to the latter prior art discussed above 2 is likely to lose stability under load, and suffer from a lowering of its sealing property and the cracking of its beads, since the bead on the intermediate plate contacts at its top the bead on the elastic metal plate facing the cylinder head.

The low sealing property of the known gasket, whether according either of the prior art gaskets discussed above, and the failure and cracking of their beads are apparently due to the facts that the beads are of the same construction between the bores of the cylinder head and block as around the bores, despite the presence of a difference in rigidity, and that the gaskets cannot adapt themselves to the distortion of the cylinder head and block which results from the difference in rigidity.

SUMMARY OF THE INVENTION

Under these circumstances, it is an object of the present invention to provide a metal gasket for a cylinder head which is inexpensive in being composed of three plates, and which can maintain a high degree level of sealing for a long period of time because of a reduction in the variation of stress in elastic metal plates and a bending stress acting upon a grommet.

This object is attained in a gasket which comprises an elastic metal base plate having a bead formed along a plurality of juxtaposed holes for combustion chambers, an elastic metal adjusting plate having a bead formed along a plurality of juxtaposed holes for combustion chambers and a grommet having a plurality of juxtaposed holes which are smaller in diameter than those in the elastic metal plates, the grommet being folded over the edges of the holes in the adjusting plate to form a plurality of juxtaposed bores, wherein the bead on the base plate is formed as a full bead between every two adjoining holes and as a half bead around each combustion chamber, while the bead on the adjusting plate is a full bead around each hole, and the bead on the base plate extends over the bead on the adjusting plate between every two adjoining bores.

The full bead on the base plate preferably has a straight starting line. The grommet is preferably folded so to have a greater folded width between every two adjoining bores than along the remaining edges of each bore. Those edges of the holes in the adjusting plate preferably have a greater thickness between every two adjoining bores than along the remaining edges of each bore. Those surfaces of the base plate, adjusting plate, and grommet which contact one another, and which contact the cylinder head and block, are preferably coated with a heat-resistant rubber, or resin.

In the above structure, a "full bead" is one having a semi-circular cross-section, while a "half bead" is one having a step-shaped cross-section.

The gasket of the present invention has a uniform distribution of pressure on its sealing surfaces because of the difference in shape of the bead on the base plate from a full bead between every two adjoining holes to a half bead around the remaining edges of each hole, because the cylinder head and block have a difference in rigidity from between every two adjoining bores to around the remaining edges of each bore, while the bead on the adjusting plate is a full bead around each hole, and the bead on the base plate extends over that on the adjusting plate between every two adjoining bores.

The gasket provides an effective seal for a long period of time; since the folded portion of the grommet holding the adjusting plate serves as a stopper for the beads on the base and adjusting plates and protects them against collapsing, The gasket can be manufactured at a low cost because it is composed of three plates, has a good balance of stress acting upon it, including a reduction in the variation of stress acting upon the base plate facing the cylinder head and more liable to displacement, and exhibits an outstanding sealing property.

Any bending stress acting upon the grommet is satisfactorily reduced, and neither the beads nor the grommet is easily broken to lower the sealing effect of the gasket.

If each full bead on the base plate is so formed as to have a straight starting line extending along an appropriate length, its strength is inversely proportional to the rigidity of the material in the narrowest portion between every two adjoining bores and the gradually widening portions contiguous thereto, and the gasket exhibits a still better sealing property because of the presence of a uniform distribution of pressure on its sealing surfaces between every two adjoining bores and in their vicinity.

If the grommet has a greater folded width between every two adjoining bores than along the remaining edges of each bore, the gasket exhibits a still better sealing property owing to a still more uniform distribution of pressure on the surfaces between every two adjoining bores.

If those edge portions of the adjusting plate over which the grommet is folded have a greater thickness between every two adjoining bores than along the remaining edge portions of each bore, the gasket exhibits a still better sealing property owing to the compensation for any deformation occurring to the cylinder head between the deck surfaces between every two adjoining bores.

Moreover, if those surfaces of the base plate, adjusting plate, and grommet which contact one another, and which contact the cylinder head and block, are coated with a heat-resistant rubber, or resin, the gasket exhibits a still better sealing property owing to a still more intimate contact of the gasket with the cylinder head and block and of the constituent members of the gasket with cost another which prevents any leakage that might otherwise be caused by any scratch or like defect formed on any member of the gasket during its manufacture.

DETAILED DESCRIPTION OF THE PREFERRED EMBODIMENTS

Figure 1:
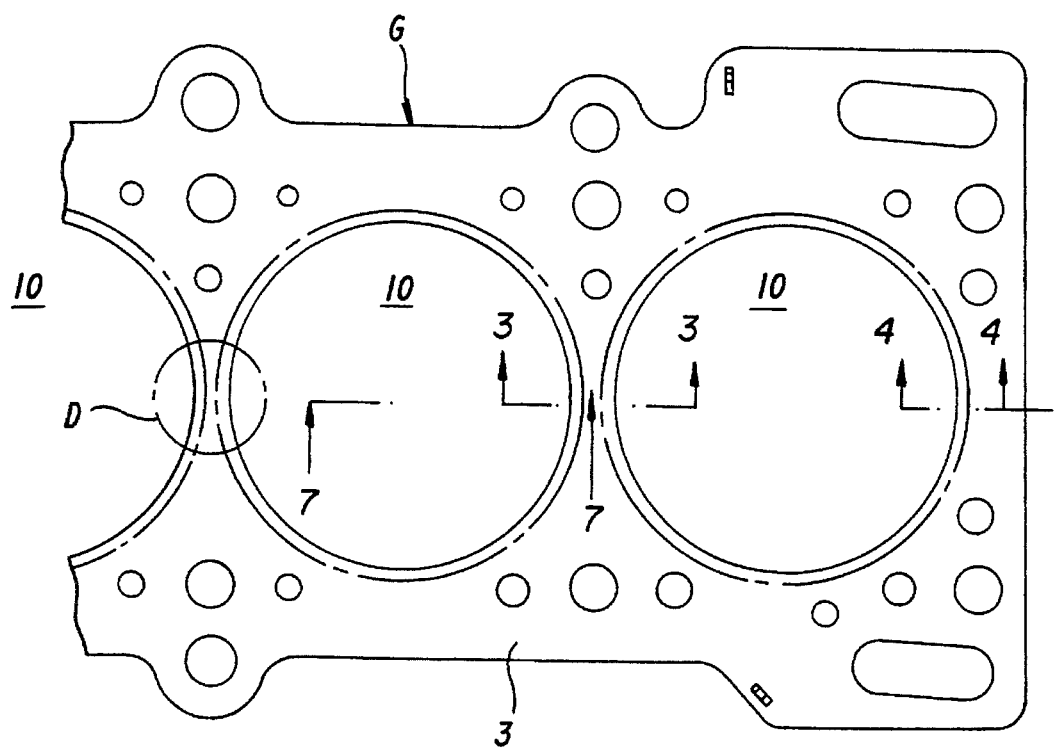
FIG. 1 is a partial top plan view of a gasket according to the present invention.
Figure 2:
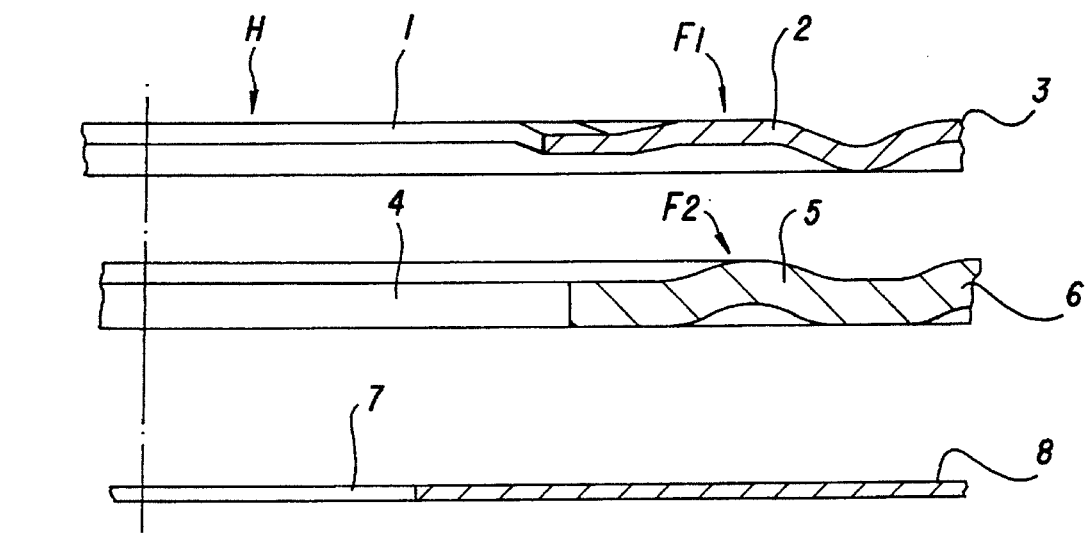
FIG. 2 is an exploded sectional view taken along the line 7—7 of FIG. 1 and showing a first embodiment of this invention.
Figure 3:
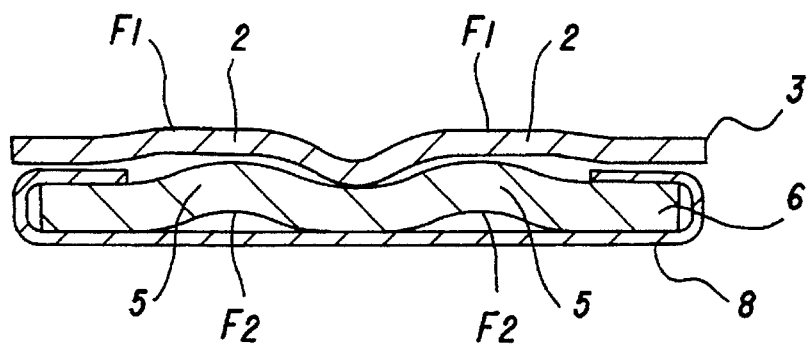
FIG. 3 is an enlarged sectional view taken along the line 3—3 of FIG. 1.
Figure 4:
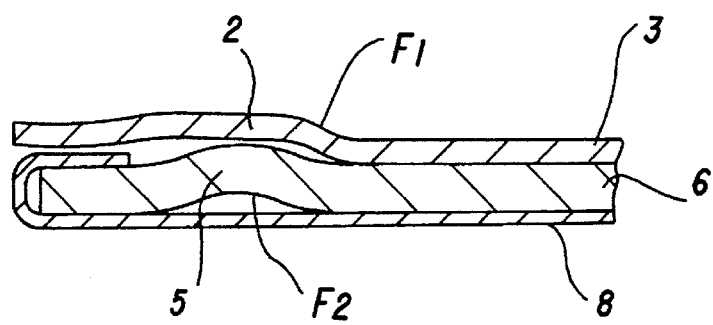
FIG. 4 is an enlarged sectional view taken along the line 4—4 of FIG. 1.

Referring to FIGS. 1 to 4, in the first preferred embodiment of the present invention there is shown a gasket G comprising an elastic metal base plate 3 having a plurality of holes 1 for combustion chambers and a bead 2 formed along the edge of each hole 1, an elastic metal adjusting plate 6 having a plurality of holes 4 for combustion chambers and a bead 5 formed along the edge of each hole 4, and a grommet 8 having a plurality of holes 7 for combustion chambers which are smaller in diameter than the holes 1 and 4. The base plate 3 is of SUS 301 ¾ H and has a thickness of 0.3 mm, the adjusting plate 6 is of SECC and has a thickness of 0.6 mm, and the grommet 8 is of SUS 304 and has a thickness of 0.15 mm. The grommet 8 is folded back toward a cylinder head to cover and hold the edges of the holes 4 in the adjusting plate 6 to thereby form a plurality of juxtaposed bores 10. The bead 2 on the base plate 3 is formed as a full bead $F_1$ between every two adjoining holes 1, but as a half bead H along the remaining edges of each hole 1, as shown in FIGS. 2 to 4. The bead 5 on the adjusting plate 6 is formed as a full bead $F_2$ along the entire edge of each hole 4. The bead 2 extends over the bead 5 between every two adjoining bores 10, as shown in FIG. 3.

Figure 5:
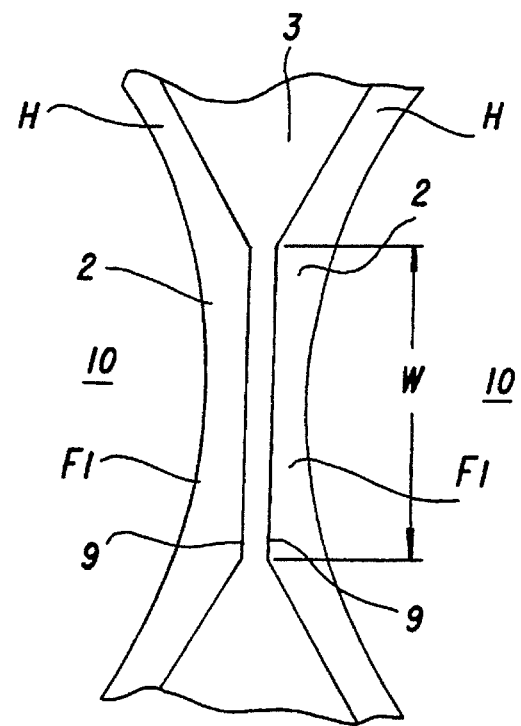
FIG. 5 is an enlarged top plan view showing part D of FIG. 1 between two bores in a second embodiment of the present invention.

FIG. 5 illustrates a second embodiment of the present invention, in which the bead 2 is formed as a full bead $F_1$ on the base plate 3 between every two adjoining holes 1 in the gasket of is so formed as to have a straight starting line 9 extending along an appropriate length W in the range of, say, 15 to 30 min.

Figure 6:
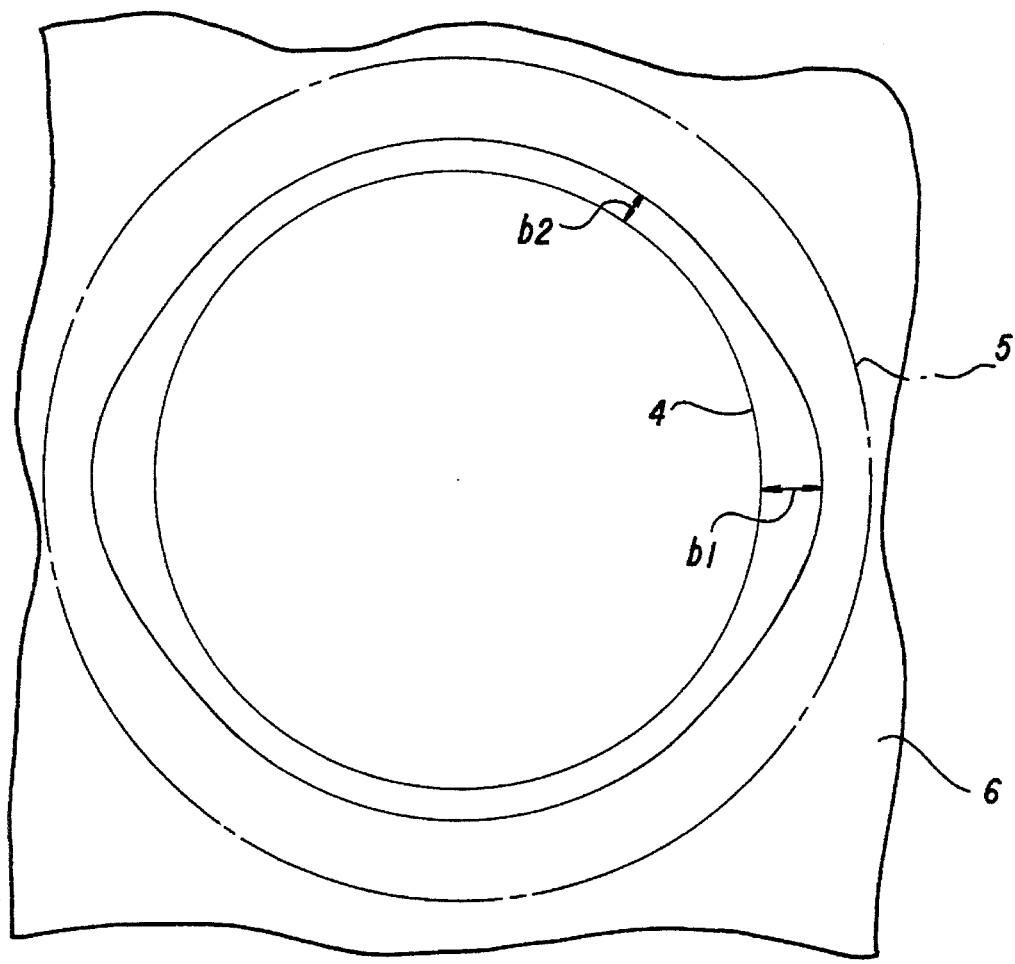
FIG. 6 is a top plan view of a part of a gasket according to a third embodiment of the present invention around a bore which is shown by excluding a base plate facing a cylinder head.

The third embodiment of the present invention includes the gasket of the first two emmbodiments, except that the grommet 8 is so folded back about the edge of each hole 4 in the adjusting plate 6 so to have a folded width $b_1$ of 2.0 to 3.0 mm between every two adjoining bores 10 and a smaller folded width $b_2$ in the range of 1.0 to 1.5 mm along the remaining edges of each bore 10, as shown in FIG. 6.

Figure 7:
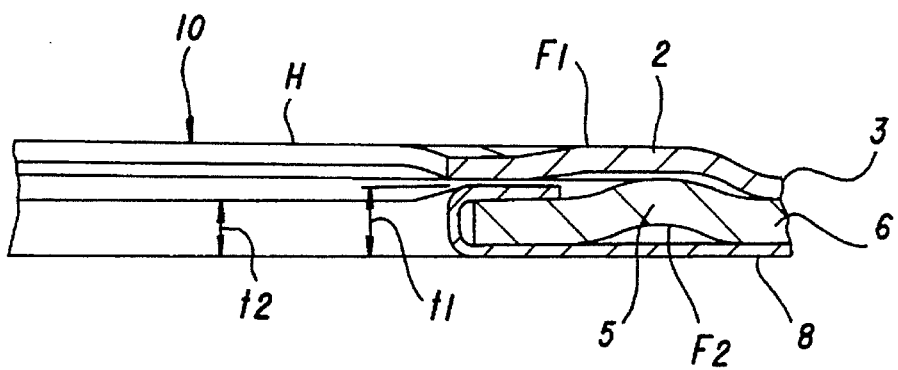
FIG. 7 is an enlarged sectional view taken along the line 7—7 of FIG. 1 and showing a fourth embodiment of the present invention.

The fourth embodiment includes the gasket of the previous embodiments, except that the adjusting plate 6 has a varying thickness along the edge of each hole about which the grommet 8 is folded, i.e., retains its original thickness $t_1$ of 0.6 mm between every two adjoining bores 10 and a reduced thickness $t_2$ of 0.550 mm along the remaining edges of each bore 10, as shown in FIG. 7.

Those surfaces of the plates 3 and 6, and grommet 8 which contact one another, and which contact the cylinder head and block, not shown, may be coated with a heat-resistant rubber, or resin, such as fluororubber or silicone rubber, though no such coating is shown in the drawings. Such coating improves the sealing property of the gasket, as it ensures a still more intimate contact of the gasket with the cylinder head and block, and of the gasket members with one another and thereby prevents any leakage that might otherwise be caused by any scratch or like defect formed on any member of the gasket during its manufacture.

What is claimed is:

1. A metal gasket for a cylinder head comprising:

an elastic metal base plate having a plurality of beads, each of said beads being formed around a respective one of a plurality of juxtaposed holes for combustion chambers;

an elastic metal adjusting plate having a plurality of beads, each of said beads being formed around a respective one of a plurality of juxtaposed holes for combustion chambers; and a grommet having a plurality of juxtaposed holes for combustion chambers which are smaller in diameter than said holes in said base plates and in said adjusting plates, said grommet being folded about the edges of said holes in said adjusting plate, said adjusting plate lying between said base plate and said grommet in intimate contact therewith to form a plurality of bores formed by aligning said holes in said base plate, in said adjusting plate and in said grommet;

said bead on said base plate being formed as a full bead between every adjoining two of said holes in said base plate and as a half bead around the remaining edges of each of said holes in said base plate, while said bead on said adjusting plate is a full bead around the entire edge of each of said holes in said adjusting plate, so that each said bead on said base plate extends over each said bead on said adjusting plate between every adjoining two of said bores.

2. A gasket as set forth in claim 1, wherein each said full bead on said base plate has a straight starting line extending along the area between every adjoining two of said holes across a width of said base plate.

3. A gasket as set forth in claim 1 or 2, wherein said grommet is folded so as to have a greater folded width between every adjoining two of said bores than along the remaining edges of each of said bores.

4. A gasket as set forth in claim 3, wherein said adjusting plate has a greater thickness between every adjoining two of said bores along said edges of said holes in said adjusting plate than along the remaining edges of each of said bore.

* * * * *